Patented Dec. 23, 1952

2,622,981

UNITED STATES PATENT OFFICE 2,622,981

PROCESS OF PREPARING STOCK FEED

Auraldo W. Bond, Eggertsville, and
Cyrus C. Lewis, Buffalo, N. Y.

No Drawing. Application December 9, 1950,
Serial No. 200,118

4 Claims. (Cl. 99—2)

This invention relates to process of preparing a stock feed from screenings of the type which are the residue from the screening of grains and seeds.

The screenings which are obtained from the cleaning of grains of various kinds and seed, such as linseed and the like, contain a considerable percentage of weed seeds as well as straw, chaff and the like. These weed seeds generally include mustard seed and possibly other seeds which are not palatable to animals and which therefore cannot be used as feed even if mixed with other animal feeds. These weed seeds, however, contain different types of proteins which are very desirable in cattle feed, particularly if mixed with other feeds, to produce the balanced ration.

Some states have laws which prohibit the feeding of screenings to cattle or other animals for the reason that these weed seeds, such as mustard seed, are generally not digested by the stock and, consequently, pass unharmed through the digestive tracts of the animals into the manure which is then used for fertilizing the fields. This, in turn, results in an excess of objectionable weeds in such fields originating from the seeds of the screenings.

It is consequently one of the objects of this invention to produce a stock feed from screenings containing various types of weed seeds by treating the screenings so that they lose their objectionable taste.

A further object is to heat the seeds to temperatures in which they become greatly enlarged or break out of their shells so that they can be readily digested and assimilated by animals.

Another object is to subject the screenings after they have been heated to a grinding or comminuting action so that they can be readily mixed with other materials to form a desirable stock feed.

It is also an object of the invention to provide a process of producing stock feed from screenings in which the weed seeds are heated to a point at which the seeds cannot germinate.

A further object is to provide a process of treating screenings containing weed seeds in such a manner as to simultaneously drive off the volatile oils or taste-producing ingredients of the seeds by heating the same and killing the life of the seed so that the same cannot germinate.

Other objects and advantages will be apparent from the following description of some embodiments of the invention, and the novel features will be particularly pointed out hereinafter in connection with the appended claims.

We have found that when mustard seed and other seeds which are unpalatable to cattle and other livestock are heated to temperatures from about 250° F. to 350° F. for approximately from one-quarter to three-quarters of an hour, the ingredients of the seeds which impart the objectionable taste to the same are driven off so that these seeds are no longer objectionable to animals. In the case of seeds having hard shells such, for example, as mustard seeds, the shells break open during the heating, somewhat like popcorn. Other weed seeds having soft shells merely become greatly expanded without actually breaking their shells. Consequently, during the heating of the seeds, the interiors or meats of the seeds are exposed directly or through their soft shells to high temperatures and give up the volatile oils or other taste-producing ingredients which then become vaporized and may be removed from the screenings by the flow of air over the same. The value of the proteins in the meats of the seeds is not depreciated during the heating or toasting of the screenings.

The temperature of about 250° F. is approximately the lowest to which the seeds can be advantageously subjected and which will render the seeds unable to germinate, even though some of the objectionable taste-producing ingredients may be volatilized at temperatures slightly below 250° F. It is, of course, objectionable to heat the screenings to such an extent that they become charred and, consequently, it is not desirable to heat them to a temperature materially above 350° F. The time to which the seeds are exposed to these temperatures may vary in accordance with the temperature to which they are exposed. If they are heated to approximately 250° F., it is desirable to permit the screenings to remain at this temperature for about three quarters of an hour. When the temperature is as high as approximately 350° F., the desired change in the seeds may be effected after one quarter hour exposure to that temperature. Temperatures substantially above 350° F. also decrease the food value of the seeds.

Any suitable or desired means may be employed for heating the screenings containing the weed seeds. For commercial production the screenings are preferably placed in a layer not exceeding several inches in depth on a conveyor passing through a heated enclosure. Such enclosure may be heated in any suitable manner, such for example as electric heating elements, and thermostatic means are preferably employed to control the temperature within the enclosure. If a conveyor is employed, the speed at which the conveyor operates is preferably such that the screenings will be subjected to the desired temperature for the correct period of time. It is, of course, also possible to place the screenings upon trays which can be manually inserted into a heating chamber and removed therefrom after the desired time interval. Any other means for subjecting the screenings to air heated to the desired temperature may be employed.

In order to entirely free the weed seeds from objectionable taste-imparting ingredients, it is desirable to provide for the removal of the gases or vapors from the container in which the screenings are heated. This may be done in any suitable or desired manner, for example, by providing for the passage of air currents through the container in which the screenings are heated, so that the vapors produced during the heating of the screenings will be continuously removed from the enclosure in which the heating takes place. When the screenings are passed through a heating chamber or enclosure by means of a conveyor, preferably slowly moving air currents are introduced into the conveyor in a direction contrary to the movement of the same through the heating chamber so that the hot air to be discharged from the enclosure will give up some of its heat to the incoming cold screenings. It has been found that better and more uniform results are obtained by heating the screenings merely by contact with air heated to the desired temperature rather than to merely place the screenings upon heated surfaces.

Screenings, of course, also contain a certain amount of straw and chaff which has no particular food value, but which forms bulk which is desired for the proper feeding of animals. This straw and chaff is not materially changed during the heating the screenings.

The screenings, after having been heated for the desired period of time, may be used as stock feed or mixed with other materials to form a stock feed containing a desired quantity of various ingredients necessary to produce a balanced ration. Preferably, however, the screenings after having been heated as herein described, are comminuted or ground to produce a product of any desired degree of fineness. We found that by subjecting the screenings to a hammer mill of ordinary or usual construction the desired degree of fineness can be readily obtained. Any seeds that have not burst their shells during the heating step of the process are then also broken up to expose the interior parts or meats of the seeds for ready assimilation by the digestive organs of the animals.

By means of the process described, the weed seeds are rendered palatable to stock since the objectionable taste-producing ingredients are driven off by the heat to which they are subjected, and at the same time these seeds are rendered innocuous so that they cannot germinate. Consequently, as a result of this process the ordinary screenings, which are more or less of a waste product, are rendered useable as a stock feed, and because of the fact that various types of weed seeds in the screenings contain proteins which are different from those contained in the feed ordinarily given to animals, these weed seeds treated according to our process are valuable to produce a balanced diet which improves the health and growth of the stock to which they are fed.

It will be understood that various changes in the details and arrangements of parts which have been hereindescribed and illustrated in order to explain the nature of the invention, may be made by those skilled in the art within the principle and scope of the invention as expressed in the appended claims.

We claim:

1. A process of producing a stock feed from screenings containing weed seeds, which comprises heating the screenings while dry to a temperature from 250° F. to 350° F. for a period of time from one-quarter of an hour to three-quarters of an hour to volatilize objectional taste-producing ingredients of the weed seeds contained in the screenings and to destroy the germinating properties of said seeds and comminuting the screenings to the desired fineness after heating the same.

2. A process of producing a stock feed from screenings containing weed seeds, which comprises heating the screenings while dry to a temperature from 250° F. to 350° F. for a period of time from one-quarter of an hour to three-quarters of an hour to volatilize objectionable taste-producing ingredients of the weed seeds contained in the screenings and to destroy the germinating properties of said seeds, and removing from the screenings the vapors discharged from the weed seeds contained in the screenings.

3. A process of producing a stock feed from screenings containing mustard seeds, which comprises heating the screenings while dry to a temperature from 250° F. to 350° F. for a period of time from one-quarter of an hour to three-quarters of an hour to volatilize objectionable taste-producing ingredients of the mustard seeds contained in the screenings and to destroy the germinating properties of said seeds, removing from the screenings the vapors discharged from the weed seeds contained in the screenings, and then grinding the screenings to reduce the size of the particles of the same.

4. A process of producing a stock feed from screenings containing weed seeds, which comprises heating the screenings while dry to a temperature from 250° F. to 350° F. for a period of time from one-quarter of an hour to three-quarters of an hour to volatilize objectionable taste-producing ingredients of the weed seeds contained in the screenings and to destroy the germinating properties of said seeds, subjecting the heated screenings to currents of air to remove from the screenings the vapors discharged from the weed seeds, passing the heated air currents containing said vapors into heat exchange relation to incoming cold screenings, and comminuting the screenings after the same have been heated to the desired fineness.

AURALDO W. BOND.
CYRUS C. LEWIS.

REFERENCES CITED

The following references are of record in the file of this patent:

UNITED STATES PATENTS

| Number | Name | Date |
|---|---|---|
| 253,821 | McDougall | Feb. 14, 1882 |
| 1,067,975 | Covey | July 22, 1913 |
| 1,553,634 | Sawyer | Sept. 15, 1925 |
| 2,112,175 | Moreton | Mar. 22, 1938 |
| 2,162,729 | Levinson et al. | June 20, 1939 |